April 22, 1969 J. P. VINDING 3,440,633
INTERROGATOR-RESPONDER IDENTIFICATION SYSTEM
Filed Oct. 18, 1965
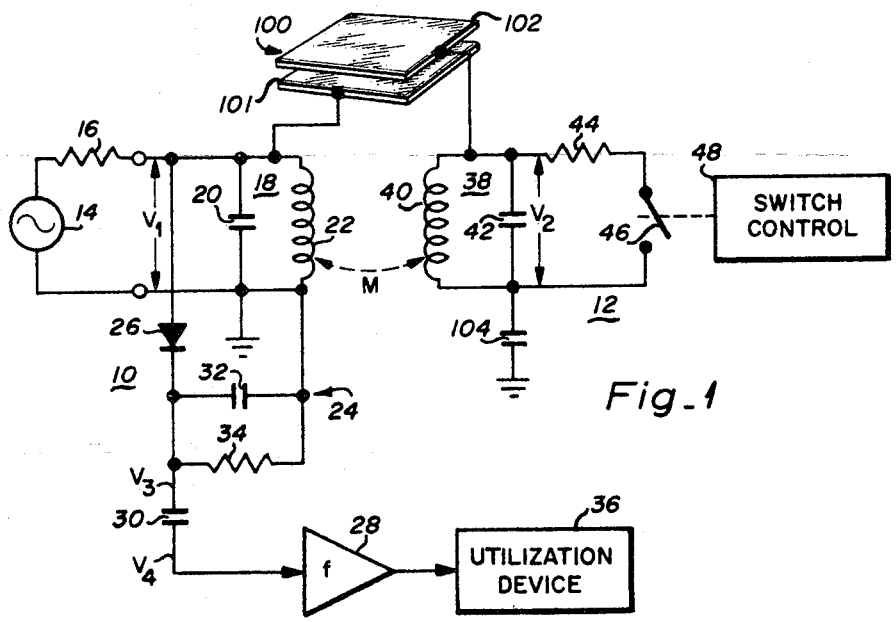
Fig_1
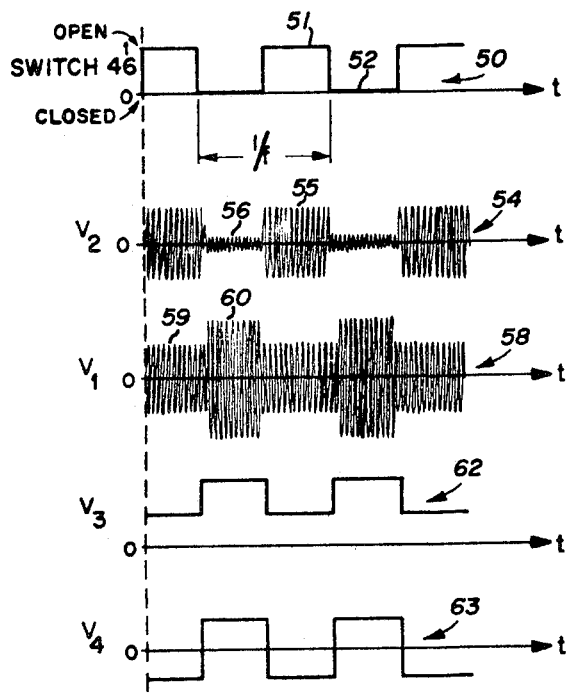
Fig_2
INVENTOR.
JORGEN P. VINDING
BY
ATTORNEY

United States Patent Office 3,440,633
Patented Apr. 22, 1969

3,440,633
INTERROGATOR-RESPONDER IDENTIFICATION
SYSTEM
Jorgen P. Vinding, 18780 Withey Road,
Monte Sereno, Calif. 95030
Continuation-in-part of application Ser. No. 453,939,
May 7, 1965. This application Oct. 18, 1965, Ser.
No. 497,181
Int. Cl. G01s 9/58
U.S. Cl. 340—258        5 Claims

ABSTRACT OF THE DISCLOSURE

An interrogator-responder system for identifying objects in which an interrogator is provided with a substantially nonradiative tuned circuit, a signal source for exciting the tuned circuit to oscillate at the interrogator frequency, and an amplitude detector for sensing the amplitude of the signal excited in the tuned circuit, and for providing an output signal when the amplitude changes in accordance with a predetermined pattern. The responder likewise is provided with a substantially nonradiative tuned circuit which is tuned to the interrogator frequency, and a detuning means which is coupled to the tuned circuit through a programmed switch whose switching rate follows the predetermined pattern to thereby identify the responder when the tuned circuits are capacitively coupled to one another.

---

This is a continuation-in-part of application Ser. No. 453,939, filed on May 7, 1965, now U.S. Patent 3,299,424.

This invention relates to an identification system for recognizing an object as a member of a class or as a particular member within that class, or both. More particularly, this invention relates to an interrogator-responder identification system in which an interrogator interrogates the object to be recognized when in coupling proximity thereto and in which the responder responds to such interrogation in a maner by which the interrogator can recognize the object either as a member of a class or as a particular member within the class.

As explained in the referenced copending patent application, interrogator-responder identification systems known heretofore are characterized in that the interrogation and the response are in the form of radio signals, i.e., they communicate by transmitting and receiving high frequency energy. In such systems, the interrogator is provided with an antenna element for radiating the interrogator signal and for receiving the responder signal, and the responder is similarly provided with an antenna element for receiving the interrogator signal and for transmitting the responder signal. The interrogator and responder signals are generally sinusoidally amplitude modulated carrier signals.

The method utilized for the recognition of the object to be identified, in prior art interrogator-responder systems, is the modulating of a carrier signal, either from the interrogator or the responder, or both, with selected modulating frequency signals, or their suppression from one or the other carrier signal. An example of such a prior art system is disclosed in United States Letters Patent No. 3,054,100 issued to C. S. Jones on Sept. 11, 1962.

While such prior art interrogator-responder identification systems for the identification of objects are eminently suitable where cost is not a factor and where the generation of radio signals is of no consequence, there are many applications where these and other factors make them unsuitable. For example, there is a great need for a simple, inexpensive and nonradiative identification system which will automatically identify employees entering a factory, an office or some other premise. For such applications, the identification of persons entering such premises may be by the class which is "authorized" to enter, or may be by identification of particular persons entering to create an individual attendance record for payroll purposes in case of employees, or for billing purposes in case of patrons or the like.

Another application, where an inexpensive and reliable identification system is desired, is in connection with automobiles either entering a selected area or passing a selected point. For example, a selected area may be set aside for the parking of selected vehicles in which case the vehicles entering should be recognized by class. In another application, the vehicles passing a toll gate should be identified individually for automatic accounting and billing to the vehicle owner.

Another application for an economical object identification system is the identification of a class of books in a library which are recognized when passing through a designated exit to prevent their theft. Or in the alternative, individual books may be separately identified for automatic check-out and check-in purposes.

Another limitation of the prior art identification system, quite aside from their high cost, is the consideration that they are radiators of radio signals which may interfere with the operation of other devices, such as communication or control equipment. For example, it is well known that many communications and instruments are affected by "spurious" radio signals in their vicinity. Furthermore, the generation of radio-frequency waves is often subject to government restrictions and control which might make an optimum carrier frequency signal unavailable to the user of the identification system, particularly since many portions of the radio-frequency spectrum are already severely overcrowded.

Finally, one further limitation of the above-mentioned radio-frequency identification system is the requirement that both the interrogator and the responder include a radiative element for efficiently radiating at the carrier frequency. This requirement is usually met by making the equivalent physical length of the antenna element equal to one or more one-quarter wavelengths of the mean carrier wavelength. Accordingly, for an efficient radiator element for a VHF carrier frequency of 250 megacycles per second, the equivalent physical size of the element must be about 1 foot. These considerations require the use of very high frequencies, which are often not commensurate with other requirements.

In the referenced copending patent application, there is described an interrogator-responder system in which an interrogator is provided with a tuned circuit which is excited at its resonant frequency. The responder is likewise provided with a tuned circuit, tuned to the same frequency as the interrogator tuned circuit, and further includes a programmed detuning means. The two tuned circuits are constructed to exhibit mutual inductance therebetween when brought into close proximity to one another. This causes intercoupling when the responder tuned circuit is not detuned which is suitably sensed by the interrogator which in turn provides an output signal indicative of the programmed detuning means.

While this interrogator-responder system is ideally suited for the applications outlined above, there are certain applications where capacitive coupling, or a combination of mutual inductance coupling and capacitive coupling are more convenient. This is particularly so where a ground connection is available from the responder and where the responder is carried by physically large objects, such as a automobile or a railroad train. Such objects may be utilized as one plate of a large capacitor making capacitive coupling with stationary object of similarly physically large size quite feasible.

It is, therefore, a primary object of this invention to provide a new and novel object identification system.

It is a further object of this invention to provide an interrogator-responder identification system which is reliable in operation, economical in construction and particularly suited for objects of large physical size.

It is a further object of this invention to provide a nonradiative portable and inexpensive responder which may be used with a stationary interrogator.

It is another object of this invention to provide an interrogator-responder identification system in which the responder is identified when capacitively coupled to the interrogator.

It is another object of this invention to provide an interrogator-responder identification system in which the responder is identified when partially inductively and partially capacitively coupled to the interrogator.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawings in which:

FIGURE 1 is a schematic circuit diagram of an interrogator and a responder constructed in accordance with the present invention; and FIGURE 2 are a number of voltage-time diagrams illustrating the voltage variations at various points in the interrogator and responder shown in FIGURE 1.

Referring now to the drawing, there is shown an interrogator means 10 and a responder means 12 which are constructed in such a manner, that upon being placed in close proximity with one another, they become capacitively intercoupled as shown by capacitor 100. Additionally, they may also become inductively coupled, as indicated by the broken line connection marked with the letter M.

The interrogator means 10 shown includes a frequency generator means 14 for generating a sinusoidal signal of an interrogator frequency F, a load impedance 16, and a tuned circuit 18 connected across the serial combination of generator 14 and impedance 16. Circuit 18 comprises a capacitive impedance 20 and an inductive impedance 22 having impedance values to tune circuit 18 to the interrogator frequency F. One side of tuned circuit 18 is grounded as shown, and the other side is connected to a member 101 which is the electrical equivalent of one plate of capacitor 100.

Coupled across tuned circuit 18 is a utilization of response signal sensing circuit 24 which includes a detector means, such as diode 26, and a tuned amplifier 28 which is tuned to a responder frequency $f$ which is much smaller than F. Detector means 26 is capacitively coupled to tuned amplifier 28 through a coupling capacitor 30. Capacitor 32 and resistor 34 respectively form the alternating current (AC) and the direct current (DC) paths across tuned circuit 18. The output signal from tuned amplifier 28 is applied to a utilization device 36 which make take the form of a bell, counter, register, or any other device capable of indicating the presence of an output signal from amplifier 28.

Responder 12 includes a tuned circuit 38 having an inductive impedance 40 and a capacitive impedance 42 whose impedance values are selected so that circuit 38 is tuned to resonance at the interrogator frequency F. One side of tuned circuit 38 is grounded either directly, or through a bypass capacitor 104 as shown, and the other side is connected to a member 102 which is physically integral with responder means 12 and which is the electrical equivalent of the other plate of capacitor 100. Connected across tuned circuit 38 is a detuning or loading means 44 in series with a switch means 46. Switch means 46 includes a switch control means 48 which controls the position of switch means 46 in accordance with a preselected program. By way of example, control means 48 may be constructed to open and close switch means 46 with a frequency $f$, the responder code frequency. As will become better understood hereinafter, the combination of switch means 46 and control means 48, utilized in practicing the present invention, is in the nature of an electronic gating circuit which alternately connects and disconnects detuning or loading means 44 across tuned circuit 38 with a frequency $f$.

In operation, interrogator tuned circuit 18 is excited by generator 14 to resonance at the frequency F. In the preferred embodiment of this invention, the physical size of circuit 18 is selected to be smaller than one-quarter wavelength of the interrogator frequency F to avoid radiation. Interrogator 10 is generally stationary and is placed so that element 101 is at a selected location such as, for example, near a gate or a railroad track.

Responder 12 is generally carried by the object to be identified, such as a car or a train, and has its tuned circuit likewise dimensioned to be practically nonradiating.

Element 102 may be part of the object to be identified, or may even be the object itself, such as for example the body of a car or the metallic bed or undercarriage of a train. Element 101 may be a plate embedded into the ground and is shaped and dimensioned so that, in combination with element 102, it forms capacitor 100 which forms an electrical connection between tuned circuits 18 and 38 at the interrogator frequency F.

When responder 12 comes within close proximity to interrogator 10, tuned circuits 18 and 38 capacitively intercouple as described, thereby transferring a signal, at the interrogator frequency F, from tuned circuit 18 to tuned circuit 38. The process of coupling herein referred is capacitive coupling by which an alternating current flows from tuned circuit 18, capacitor 100, tuned circuit 38, and capacitor 104 to ground. When so coupled, tuned circuit 38 loads tuned circuit 18. Detuning means 44 (the term detuning as used herein denotes not only frequency detuning but also loading) may either be a low resistive impedance or a reactive impedance or a combination of a resistive and a reactive impedance. Generally speaking, detuning means 44 is selected so that when switch 46 is closed, it either loads and/or detunes circuit 38.

As is well known to those skilled in the art, a substantially non-dissipative, tuned secondary circuit reflects a maximum load on the primary circuit to which it is coupled and the amplitude of the signal in the primary circuit will be a minimum. If the secondary circuit is made either very lossy or is detuned, its loading effect on the primary circuit is very substantially decreased. Accordingly, upon closure of switch 46, circuit 38 either becomes detuned or very lossy thereby decreasing its loading effect upon tuned circuit 18.

Referring now to FIGURE 2, there are shown a number of curves illustrating the operation of this invention. Curve 50 is a position versus time graph which illustrates successive positions of switch 46, and shows switch 46 in its open position at 51 and in its closed position at 52. If switch 46 is opened and closed with a frequency $f$, then the time between such successive openings would be $1/f$ seconds as shown on the time scale of graph 50. Graph 54 is a voltage versus time graph showing the amplitude of the voltage induced into tuned circuit 38. This voltage is a maximum, as shown at 55, when switch 46 is open reflecting a low-loss tuned circuit and is a minimum as shown at 56 when switch 46 is closed reflecting a high-loss or detuned circuit.

Graph 58 is a voltage versus time curve of the voltage across tuned circuit 18 and indicates that the signal amplitude is a minimum, as shown at 59, when switch 46 is opened and a maximum, as shown at 60, when switch 46 is closed. Graph 62 is a voltage versus time curve showing the detected voltage at the output terminal of detector 46. This curve, of course, is the envelope of graph 58 and follows the responder frequency $f$. Graph 63 is the voltage versus time curve of the voltage applied to tuned amplifier 28 and is identical to graph 62, except that the DC component has been removed by coupling capacitor 30. The signal represented by graph 63, and to which amplifier 28 is tuned, is suitably amplified and applied to utilization means 36 to give an alarm or to operate a control circuit depending on how the interrogator-responder identification system of this invention is utilized.

While amplifier 28 is preferably tuned to the responder switch means frequency $f$ for maximum selectivity and discrimination against noise, it is to be understood that the invention will also operate satisfactorily with an untuned amplifier. The frequency ranges for $f$ and $F$ may be selected from a wide range and are not critical. For example, frequency F may be selected from 10 kilocycles to above 10 megacycles. At very much higher frequencies, the physical dimension of either tuned circuit may become inconveniently small if radiation is to be avoided. The responder switching frequency is selected to be much less than the interrogator frequency and is typically chosen from 2 to 50 kilocycles per second.

Intercoupling of tuned circuits 18 and 38 may also be accomplished by a combination of capacitive and inductive intercoupling. Since the operation of the interrogator-responder system of this invention depends on detuning a secondary circuit at a selected frequency and noting such detuning by a primary circuit, the particular method of intercoupling the tuned circuits will not materially affect the recognition of the secondary circuit.

Even though the capacitively coupled interrogator-responder system of this invention is particularly suitable in connection with the recognition of a large metallic object, since the object itself often lends itself to form element 102, this invention is also suitable for small objects, particularly where identification of an object allows for the accurate positioning of the object with respect to an interrogator. For example, if the object to be recognized is an identification badge, and identification is to take place when the badge is inserted into a slot of an interrogator, the badge itself may form element 102 and its small physical size is offset by the accurate positioning of the badge with respect to an element 101 of an interrogator.

I claim:
1. An interrogator-responder system for identifying objects, carrying coded responders, when the responder carrying object comes into close proximity to an interrogator, said system comprising:
an interrogator including, a first tuned circuit tuned to an interrogator frequency and dimensioned to be substantially nonradiative, signal source means coupled to said first circuit and providing substantially constant and continuous power to excite the same to oscillate at said interrogator frequency, a first element coupled to one side of said first circuit, signal amplitude sensing means coupled to said first circuit to provide an output signal commensurate with the amplitude of the oscillations in said first circuit, and utilization means responsive to said output signal and operative to provide an identification indication when the amplitude of said output signal varies in accordance with a preselected code frequency; and
at least one responder, said responder including a second tuned circuit tuned to said interrogator frequency and dimensioned to be substantially nonradiative, a second element connected to one side of said second circuit, said first and second elements forming a capacitive coupling between said first and second circuits when brought into close proximity, circuit loading means, and switching means for connecting said circuit loading means to said second circuit, said switching means being operative to alternately connect and disconnect said circuit loading means into and out of said second circuit in accordance with said preselected code frequency, said circuit loading means being operative to alter the load reflected by said second circuit into said first circuit when said first and said second elements are in close proximity to provide capacitive coupling between said first and second circuits.

2. An interrogator-responder system in accordance with claim 1 in which said switching means comprises an oscillator and in which said circuit loading means detunes said second circuit.

3. An interrogator-responder system in accordance with claim 1 in which said signal amplitude sensing means comprises a detector and in which said utilization means includes a frequency means responsive to said preselected code frequency, the signal from said detector being applied to said frequency means and being passed thereby only if the amplitude modulations correspond to said preselected code frequency.

4. An interrogator-responder system in accordance with claim 1 in which said switching means comprises an oscillator and in which said circuit loading means loads said second circuit.

5. An interrogator-responder system in accordance with claim 1 in which said switching means comprises an oscillator and in which said circuit loading means detunes and loads said second circuit.

References Cited
UNITED STATES PATENTS

| 2,511,409 | 6/1950 | Mayberry. | |
| 2,812,427 | 11/1957 | Magondeaux | 343—225 X |
| 3,092,806 | 6/1963 | Field. | |
| 3,189,885 | 6/1965 | Shields | 340—258 |
| 2,774,060 | 12/1956 | Thompson | 340—258 |

THOMAS B. HABECKER, *Primary Examiner.*

D. L. TRAFTON, *Assistant Examiner.*

U.S. Cl. X.R.

340—51, 152; 343—6.5